United States Patent
Griffith et al.

(10) Patent No.: US 7,958,073 B2
(45) Date of Patent: Jun. 7, 2011

(54) SOFTWARE AND METHODS FOR TASK METHOD KNOWLEDGE HIERARCHIES

(75) Inventors: Todd Griffith, Williamsport, PA (US); Robert Ross, Williamsport, PA (US)

(73) Assignee: Discovery Machine, Inc., Williamsport, PA (US)

( * ) Notice: Subject to any disclaimer, the term of this patent is extended or adjusted under 35 U.S.C. 154(b) by 1909 days.

(21) Appl. No.: 10/326,386

(22) Filed: Dec. 23, 2002

(65) Prior Publication Data

US 2004/0122788 A1  Jun. 24, 2004

(51) Int. Cl.
*G06N 5/00* (2006.01)
(52) U.S. Cl. ........................... 706/46; 706/45
(58) Field of Classification Search .................. 706/46, 706/50, 45; 707/4
See application file for complete search history.

(56) References Cited

U.S. PATENT DOCUMENTS

| | | | |
|---|---|---|---|
| 5,963,939 A * | 10/1999 | McCann et al. | 707/4 |
| 6,493,697 B1 * | 12/2002 | Stier et al. | 706/50 |
| 6,499,024 B1 * | 12/2002 | Stier et al. | 706/50 |
| 6,587,847 B1 * | 7/2003 | Stier et al. | 706/50 |

OTHER PUBLICATIONS

Murdock, Self-Improvement through Self-Understanding: Model-Based Reflection for Agent Adaptation, Thesis, Georgia Institute of Technology, Jul. 2001, 1-311.*

* cited by examiner

*Primary Examiner* — Wilbert L Starks, Jr.
(74) *Attorney, Agent, or Firm* — Haynes and Boone, LLP

(57) ABSTRACT

A system is disclosed for the graphical entry of knowledge information in Task-Method-Knowledge (TMK) notation into a computer system. The system comprises methods for entering the TMK hierarchy, defining new tasks 510, methods 512, procedures 522, and subtasks 518. Defined elements may be reviewed, modified, or deleted. Inputs to the tasks may be defined and the outputs of methods and procedures may be assigned. The hierarchy may be processed towards a solution. The entered hierarchy is displayed with visual clues as to the state and progress of the solution process.

20 Claims, 11 Drawing Sheets

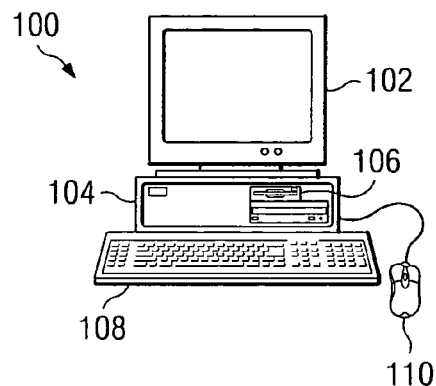
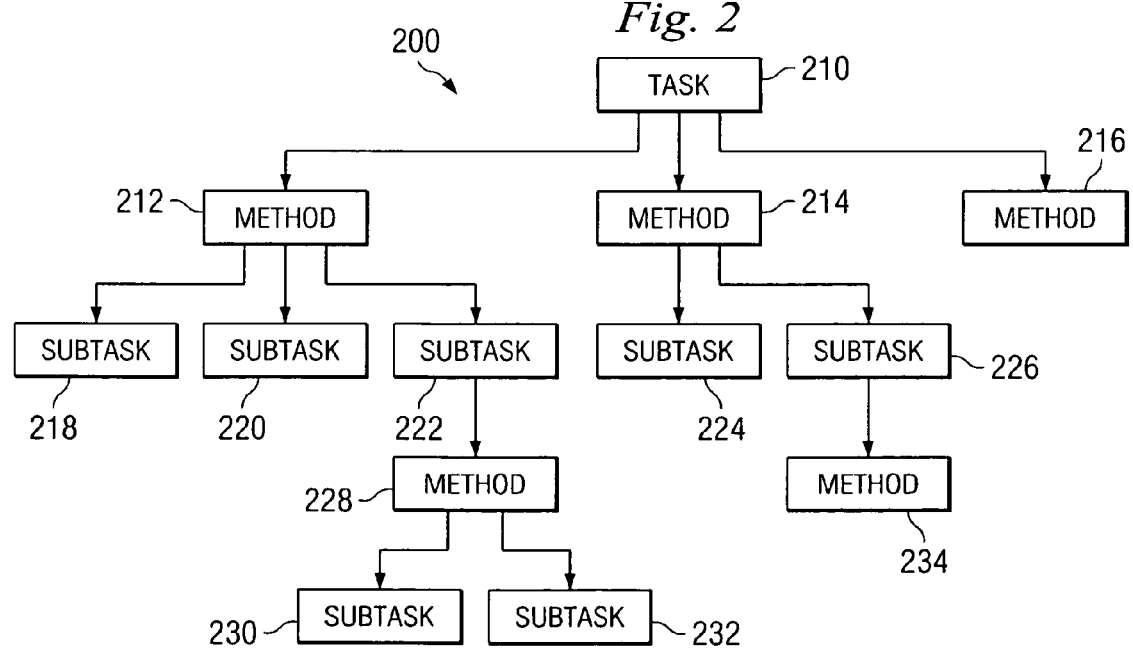

| TOILET | | | | |
|---|---|---|---|---|
| Structure | | | | |
| Components | | | | |
| *Name* | *Type* | | | |
| Bowl | Container | | | |
| Tank | Container | | | |
| Valve | Valve | | | |
| Flapper | RubberPart | | | |
| Float | Float | | | |
| Handle | MetalPart | | | |
| Drain | Pipe | | | |
| Source | Pipe | | | |
| Connections | | | | |
| *Name* | *Type* | *From* | *To* | *Substance* |
| C1 | Pipe | Tank | Bowl | Water |
| C2 | Pipe | Bowl | Drain | Water |
| C3 | Chain | Handle | Flapper | Userpress |
| C4 | Hinge | Flapper | Tank | |
| C5 | Lever | Float | Valve | Vector |
| C6 | Pipe | Valve | Tank | Water |
| C7 | Pipe | Source | Valve | Water |
| Behaviors | | | | |
| *Name* | *Type* | | | |
| Fill | Procedure | | | |
| Flush | Method | | | |
| Function | | | | |
| *Name* | *Behavior* | | | |
| Clean | Flush | | | |
| *Given Name* | *Given Type* | | | |
| Clean water | Liquid | | | |
| Force on handle | Force | | | |
| *Makes Name* | *Makes Type* | | | |
| Clean bowl | Container | | | |
| *Substance* | | | | |
| Water | Liquid | | | |
| Userpress | Force | | | |
| Vector | Force | | | |

310 — Structure
312 — Behaviors
316 — Fill
314 — Function

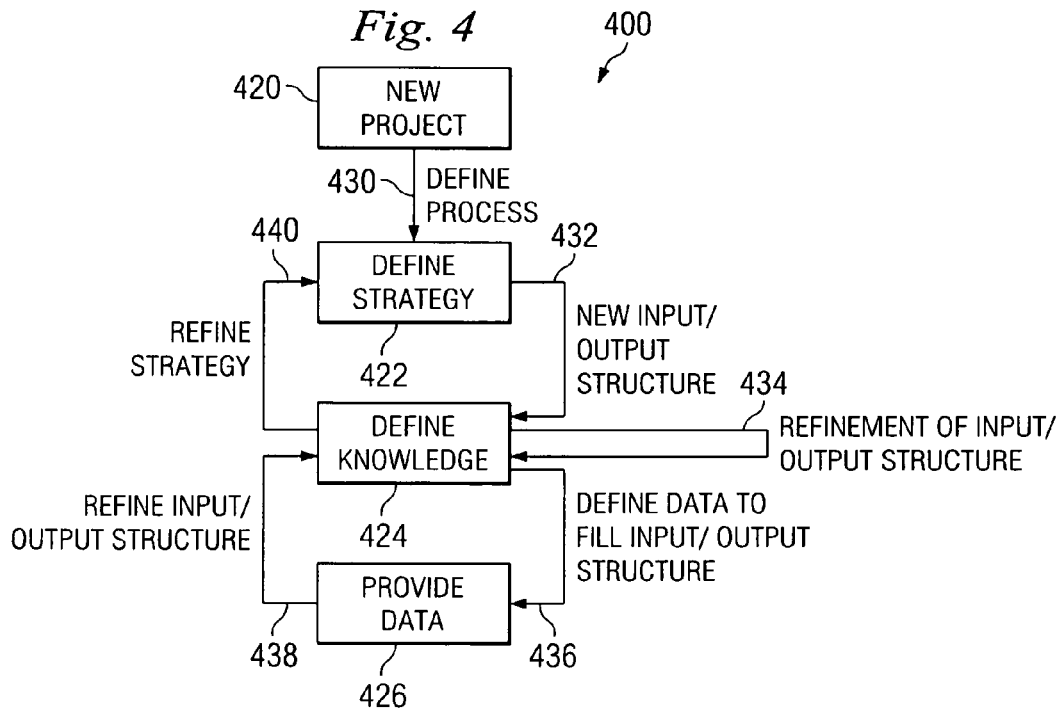
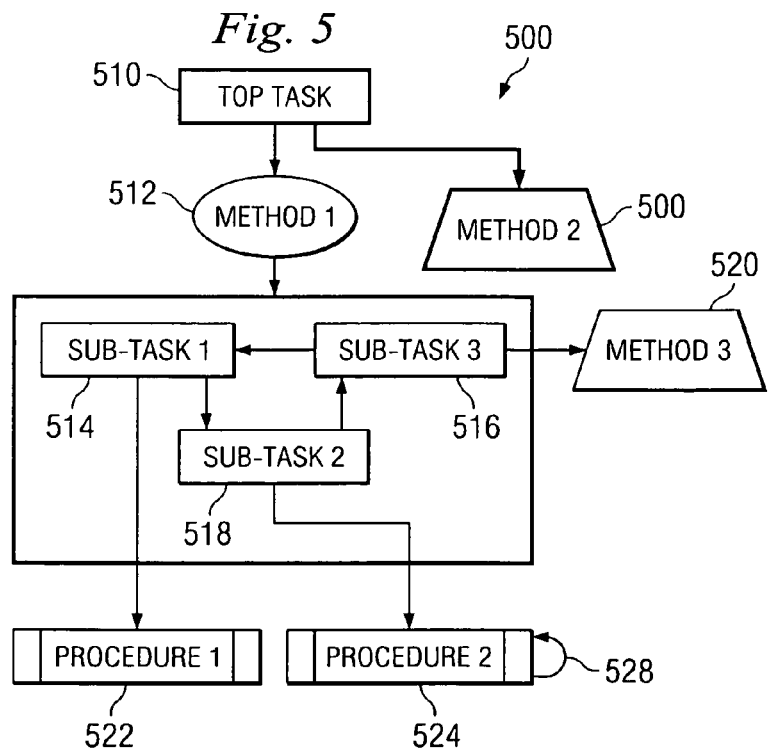

Toilet

610 — STRUCTURE

Components

| Name | Type |
|---|---|
| bowl | Container |
| tank | Container |
| valve | Valve |
| flapper | RubberPart |
| float | Float |
| handle | MetalPart |
| drain | Pipe |
| source | Pipe |

612 — Connections

| Name | Type | From | To | Substance |
|---|---|---|---|---|
| C1 | Pipe | tank | bowl | water |
| C2 | Pipe | bowl | drain | water |
| C3 | Chain | handle | flapper | userpress |
| C4 | Hinge | flapper | tank | vector |
| C5 | Lever | float | valve | |
| C6 | Pipe | valve | tank | water |
| C7 | Pipe | source | valve | water |

614 — BEHAVIORS

| Name | Type |
|---|---|
| Fill | Procedure |
| Flush | Method |

616 — FUNCTION

| Name | Behavior |
|---|---|
| Clean | Flush |

| Given Name | Given Type |
|---|---|
| clean water | Liquid |
| force on handle | Force |

| Makes Name | Makes Type |
|---|---|
| clean bowl | Container |

616 — Substance

| Name | Type |
|---|---|
| water | Liquid |
| userpress | Force |
| vector | Force |

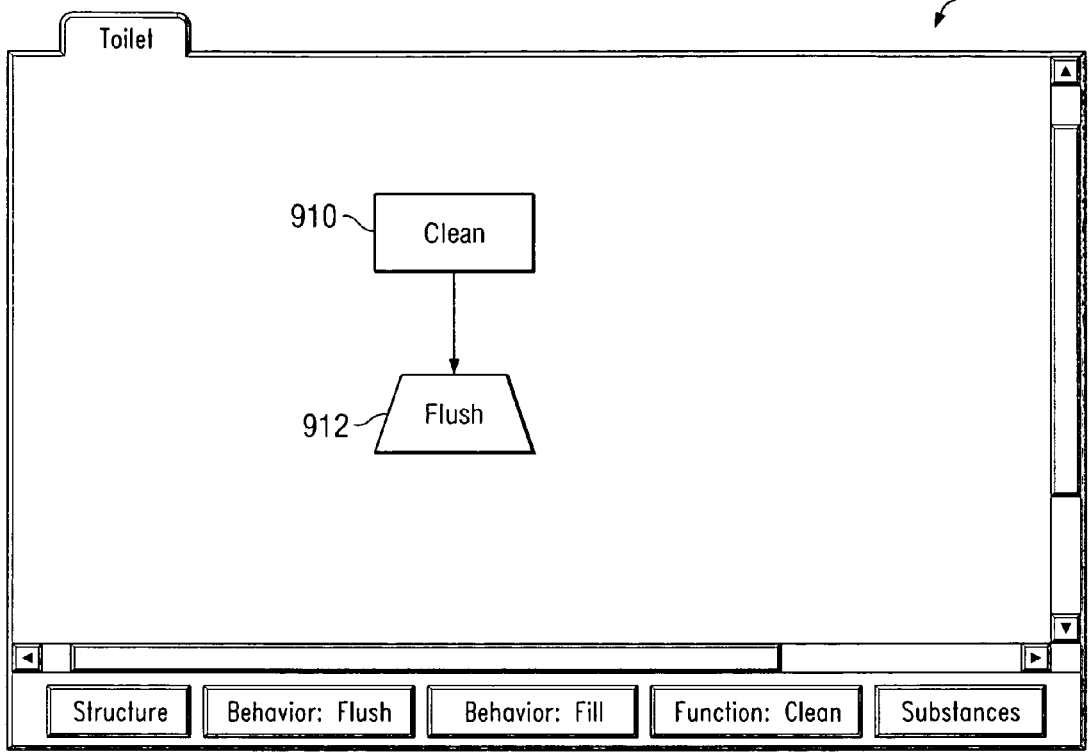

SOFTWARE AND METHODS FOR TASK METHOD KNOWLEDGE HIERARCHIES

This invention was made with Government support under contract DAAH01-01-C-R050 awarded by the U.S. Army Aviation/and Missile Command. The Government has certain rights in the invention.

FIELD OF THE INVENTION

The current invention relates to computer systems in general and specifically to computer-based knowledge systems and the entry of strategic knowledge data items.

BACKGROUND OF THE INVENTION

Since the invention of computer systems, it has been a goal to provide systems which "think", which adapt themselves to new situations, new problems, new forms of input; not just providing answers, but also providing solutions not previously anticipated. Under the broad umbrella of artificial intelligence, two main approaches have developed: machine learning, and knowledge acquisition. The goal of machine learning is to provide computers with the ability to acquire knowledge on their own from observations or through instruction, while knowledge acquisition systems attempt to make computers "expert" in some area by drawing knowledge from experts, encoding this knowledge for use in a computer system, and providing software programs which use this knowledge to develop solutions.

Current knowledge acquisition systems require knowledge engineers working with software engineers to interview experts, capture the knowledge, encode the knowledge in a computer-usable format, and write or use software to use the knowledge. This process is expensive, requires specialized training, is inefficient in the use of the expert's time, and is often unsuccessful in producing useful knowledge or solutions. The process also requires that knowledge be entered as strings of text in a format very like that of a programming language. This entry often requires substantial experience and skill in the language and the process of encoding knowledge into this language.

Prior art systems and methods which process Task Method Knowledge ("TMK") hierarchies using software require the entry of the hierarchy (typographically) in a programming language, such as LISP. As is well-known, visual systems are available for a number of current programming languages including C++ and BASIC. These systems, however are not useful in the entry of TMK knowledge systems, and cannot be modified to support TMK as they ultimately devolve to the typographic entry of programming language statements. It is the typographic entry of programming statements which are avoided by the current invention. There are also well-known systems for the visual entry of non-programmatic entities, specifically, architectural plans, maps, electronic design diagrams, and many others. These systems are also of no use in the entry of TMK knowledge systems and the result of these entry systems is a static entity which may be reviewed, printed, etc., but is not processed to solution as a knowledge system.

There is also patented prior art including U.S. Pat. No. 5,806,056 Hekmatpour which discloses an expert system and method employing hierarchical knowledge base, and interactive multimedia/hypermedia applications. However the hierarchical knowledge base is not of TMK structure and cannot be modified to use TMK. Additionally, the disclosed system does provide a graphical interface for the entry of its hierarchy, however, this graphical interface also devolves to the entry of knowledge as textual programmatic statements. The present invention provides an interface which does not include the entry of knowledge as text statements. Current TMK knowledge processing systems solve the hierarchy by compiling the language statements which define the hierarchy, then run the compiled program on a suitable computer system. This runs the hierarchy as a computer application written in the language of the hierarchy statements. As such, any tracing or loggings of events are as a computer program in that language. The user of such a system cannot stop the program and inspect the knowledge processing to that point except to stop the program at a specific programming statement. The user cannot stop the processing a specific method, process, or other object of the hierarchy. Nor can the user see the hierarchy run except as stepping through programming language statements. Thus it takes programming skill to not only enter the hierarchy, but also to run, debug, analyze and modify the hierarchy to solution.

OBJECTS OF THE INVENTION

It is therefore an object of the current invention to provide a simple, graphical interface for the entry and editing of TMK knowledge. It is a further object of the current invention to provide a user interface and storage system for entering TMK knowledge which the expert himself or herself can operate, thus eliminating the need for a specialized knowledge engineer. It is a further object of the present invention to eliminate the need for a specialized textual language for the entry of TMK hierarchies.

It is a further object of the present invention to allow for the visual entry of the TMK knowledge to then be directly processed to solution, using visual clues to display the solution process.

It is a further object of the present invention to provide a novel storage system for representing knowledge information which allows for direct manipulation of the knowledge entities.

It is a further object of the present invention to provide for an engine which will process the stored hierarchy to solution and interact with the user through the user interface to allow the user to dynamically control and display the solution process, including single-step, run, and breakpoint modes.

SUMMARY OF THE INVENTION

Methods and software for entering and solving knowledge hierarchies are disclosed. This system comprises a computer user interface, allowing a user to enter knowledge into a knowledge acquisition system without the use of a knowledge expert, a storage system for knowledge information which allows for this user interface, and a processing system (engine) which solves the entered and stored hierarchy.

The system for entering the hierarchy displays tasks, subtasks, methods, and procedures graphically, allowing the user to see, move, and manage knowledge entities in an obvious and straightforward manner. This user interface is graphical, as opposed to typographic. The user manipulates the tree of nodes representing the knowledge directly using various interactive techniques, including "drag and drop", mouse movements, mouse button click and double click, menu selection, data entry into formatted input panels, and keystrokes and combination of key strokes. Panels will be understood to be computer displayed windows, frames or graphic devices which are separated functionally and visually from one another in a graphical interface. The user interaction with the graphical interface is translated into changes in the stored representation of the hierarchy. The present invention allows the user to define one or more knowledge data collections or "projects". Within each project are tasks, methods, procedures, and subtasks. The tasks have methods or procedures which implement or solve the task. Methods may be divided into subtasks, which in turn have methods or procedures. The user may define these in any sequence, and once defined may be reviewed or modified. Previously defined elements may be re-used within the hierarchy. Input structures and data for the knowledge system are entered. This process is also graphical, iterative, and interactive so that the user directly enters and manipulates the structures and locates the structures as input and output of methods within the hierarchy. Previously defined structures and data may be reviewed and modified, and previously located structures may be reused or relocated within the hierarchy.

Once the knowledge hierarchy, structures and data are interactively and graphically entered, the knowledge system may be run to solution using the invention's knowledge engine. This involves activating one of the high level tasks and processing through the hierarchy using the initial data values as inputs to the tasks, methods, and procedures. The path through the hierarchy is processed according to the logic entered by the user. The processing of the knowledge system allows for logging and tracing of the hierarchy path and data so that the user may examine both interim and final results. The engine interacts with the user interface and thereby allows the user to control and display the hierarchy dynamically as it is processed to solution. The present invention provides a technical advantage over current art by allowing direct entry of knowledge by a user not necessarily skilled in knowledge engineering. The user interface is both graphical and intuitive so that the user is quickly and easily able to enter knowledge, and then process the knowledge to solution. It also includes a technically advanced processing engine for the solving of the entered hierarchy, which interacts with the user interface to allow the user to dynamically control and display this process.

BRIEF DESCRIPTION OF THE DRAWINGS

FIG. 1 illustrates a computer system on which the present invention may be practiced;

FIG. 2 illustrates a TMK hierarchy of a task, methods, and subtasks;

FIG. 3 illustrates an SBF table of structure, behavior, and function;

FIG. 4 illustrates the process flow of the present invention;

FIG. 5 illustrates one embodiment of the TMK view panel;

FIG. 6 illustrates one embodiment of the form view panel;

FIG. 9 illustrates one embodiment of the function sheet panel;

FIG. 10 illustrates one embodiment of the substance sheet panel;

BEST MODE AND OTHER EMBODIMENTS OF THE INVENTION

Figure 7:
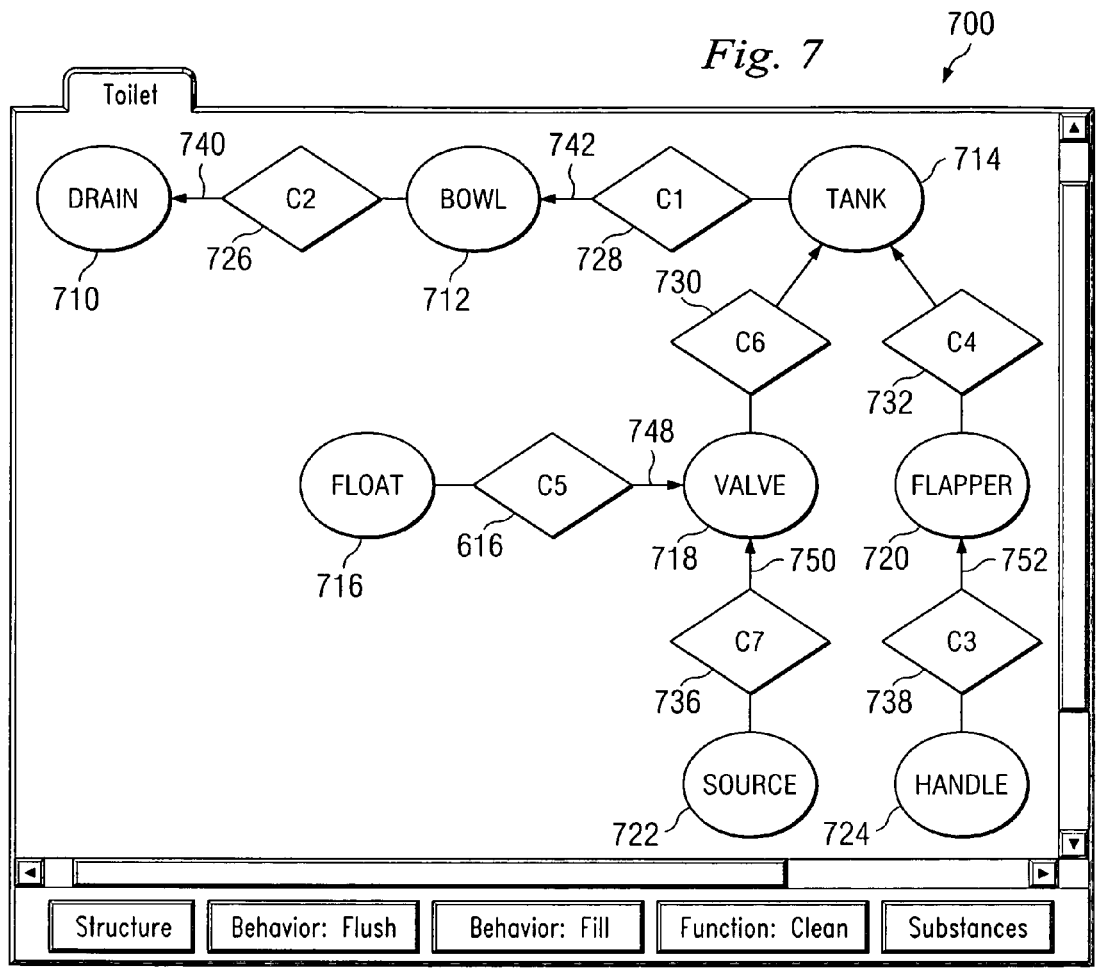
FIG. 7 illustrates one embodiment of the structure sheet panel.

The present disclosure relates to the use of computer-based knowledge acquisition systems, and more specifically to the gathering, representing, and processing of knowledge through a computer interface with a user. It is understood, however, that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring now to FIG. 1, knowledge acquisition is often accomplished using a computer system 100. Such a system 100 frequently comprises a monitor 102 or other display device, a computer processing unit 104 including a processor (not shown), storage devices (both internal and external magnetic and optical disks, etc.) 106, and input devices such as a keyboard 108 and/or mouse 110. Other devices or peripherals such as output devices (e.g., printers) and communications devices (local area networks, modems, etc.) (not shown) may also be accessible to the system 100. One or more of the storage devices 106 may contain data representing a programmed embodiment of a knowledge acquisition system, which may include a knowledge engine designed to process information.

In operation, a user may enter information into the system 100 in response to a display shown by a program designed for a particular task. The user may retrieve, review, modify, or enter new knowledge into the program until satisfied. The user may then define initial and desired values and parameters as input to the knowledge engine, which processes the knowledge to find a solution. If a solution is found, the results are displayed to the user. If a solution is not found, the user is informed and given an opportunity to make modifications to the parameters and repeat the process.

Figure 15:
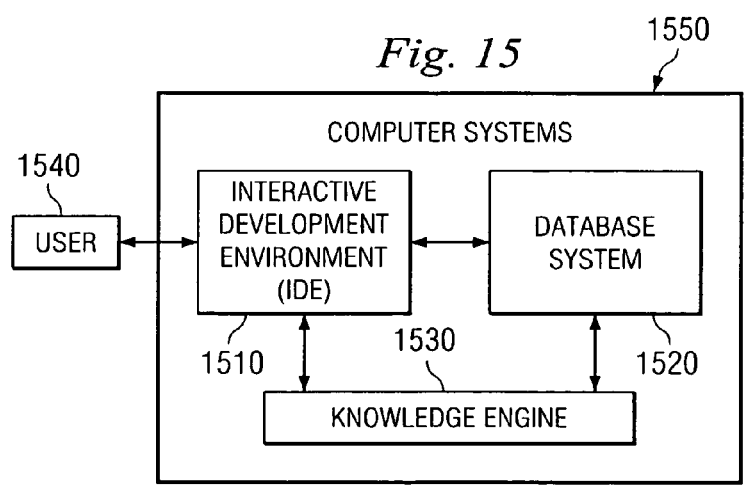
FIG. 15 illustrates one embodiment of the components of the invention.

Referring now to FIG. 15, this illustrates one embodiment of the invention. A computer system 200 includes software components of Interactive Development Environment (IDE) 210, Database System 220, and Knowledge engine 230. The IDE is an interface to a user interface, in this case an interface to a graphical user interface of a PC. The user 202 interacts with the IDE using the various input and output devices of the computer system 204. Using the IDE 210, the user 202, enters the structure of the TMK hierarchy, including all tasks, subtasks, methods, and procedures. The hierarchy structure is saved in the Database System 220 in an internal format. That is, the hierarchy is passed to the Knowledge engine 230 which verifies the structure, and then converts it to an internal format, suitable for saving on the Database System 220. The IDE 210 may pass the hierarchy to the Knowledge engine 230 one component at a time (e.g. one task, subtask, method, procedure, or data structure) or the entire hierarchy at once, or one portion of the hierarchy, for example, a changed portion of the hierarchy. Once saved, the hierarchy is available for the process shown in FIG. 16.

Referring now generally to FIGS. 2 and 3, two knowledge encoding approaches used in knowledge acquisition are illustrated. One approach (FIG. 2) utilizes a task-method-knowledge ("TMK") hierarchy that encodes problem-solving strategies in a hierarchy representing strategies developed by experts for specific problems. This approach began with research by Ashok Goel at the Georgia Institute of Technology in Atlanta, Ga.

The other approach (FIG. 3) encodes knowledge about artefacts and objects in terms of their structure, behaviors, and functions (and so named "SBF"), and explicitly specifies the structure and function of a device or object and the internal behaviors that explain how the device works. The encoded knowledge may be used to perform high-level design tasks. For example, the knowledge may be applied to modify an existing design to obtain a device which performs specific desired functions.

Referring now to FIG. 2, a TMK hierarchy is illustrated by a tree of nodes 200. The tree 200 comprises a task 210, which represents a high-level problem to be solved. In general, a TMK hierarchy may include any number of high-level task nodes. Methods 212, 214, and 216 represent three approaches to solving the task 210. Subtasks 218, 220, and 222 may provide input to method 212 as alternative approaches or as providing data that when combined with the data of the other subtasks satisfies method 212. Subtasks may themselves have methods which may have child subtasks, where the processing of a subtask involves the processing of associated subtasks.

Similarly, subtasks 224 and 226 provide input to method 214. Method 216 has no subtasks and is called a "procedure", which is an atomic method. An atomic method is a process which does not spawn subtasks and may be an algorithm, a database retrieval, a request for user information, or a similar process. In a similar fashion, method 228 solves subtask 222, having itself subtasks 230 and 232. The TMK hierarchy may be extended by adding additional methods having subtasks and/or subtasks having methods or procedures.

The TMK hierarchy illustrated by the tree 200 utilizes "strategic" knowledge that applies the thought process of an expert to attack and solve a problem. Arriving at a solution may include identifying inputs to each of the tasks and identifying initial states, values, parameters, and knowledge. A knowledge engine processing the tree 200 begins at the main task and attempts to find one or more solutions using the initial values and associated methods and procedures. If the problem is not solved directly, it may be broken down into subtasks. Each subtask is composed of one or more method or procedure and is processed to find a solution to that particular subtask.

For example, the high-level task 210 may be to design a new device such as a toilet. The task 210 may include a specific goal or may be bounded by a set of parameters. For example, the task 210 may be to design a toilet using less water. In this way, the task 210 may be defined by one or more desired features or properties. This high-level task 210 may be associated with several possible methods 212-216 leading to a solution of providing the desired design. The method 212 may reach a solution by designing an original toilet, while the method 214 may involve modifying a current design. The method 216 may look at designs of related non-toilet devices (e.g., pumps) and ways to modify them into a toilet. Each method 212-216 may have inputs. Accordingly, the method 212 may have as inputs a number of standard toilet specifications for tank and pipe capacities or pipe diameters, both of which enable the designer to design an original toilet. The method 214 may have current designs as input, while the method 216 may have designs of non-toilet devices as input. Likewise, each method 212-216 may include outputs. In the present illustration, the output is the solution of providing a new toilet design.

Each method 212-216 may be further broken down into subtasks/methods 218-234. The output of each subtask/method 218-234 may be the solution to the high-level task 210, input to a method, or input to another subtask. In the present illustration, the subtask 218 may design the tank. The subtask 220 may design the water flow through pipes and valves and may provide input to the subtask 218. The subtask 222 may design the handle which activates the flush of the toilet. The method 228 and subtasks 230, 232 may provide additional input into the design of the handle in subtask 222. The subtask 224 associated with the method 214, may be to find current toilet designs. This subtask may have methods (not shown) of using existing knowledge (e.g., the amount of water used by current designs) or may have several methods of acquiring the water use values (e.g., calculate from the size of a tank or lookup in a data collection of device characteristics). The subtask 226 is to design a tank requiring less water and may be associated with a method 234 which determines how much water is needed to fill a tank.

In this manner, the problem is solved within the TMK hierarchy by decomposing the high-level task into methods and procedures which solve the problem, or by spawning subtasks which solve the problem or provide information needed by another task, subtask, or method.

TMK knowledge bases may be used to solve substantial problems. For example, they may analyze economic indicators or census data, invest in stock markets, predict the results of elections, diagnose disease, prescribe medicine, produce tax returns, and perform a variety of other complex tasks. TMK knowledge bases are applicable to problems which use expert knowledge to strategically find solutions by decomposing problems into smaller problems which are iteratively decomposed and solved.

However, TMK hierarchies do not provide artefact knowledge (e.g., information about specific instances of models). In the above example, the goal of subtask 226 is to design a tank requiring less water, and while it may be decomposed further to define the strategic methods to accomplish this goal, TMK does not avail itself of the details of the newly designed tank (e.g., dimensions, materials, fluids and their flow through the device). Using TMK alone, the solution to subtask 226 requires specific and customized programming or other means for determining the size of the newly designed tank.

Referring now specifically to FIG. 3, an SBF artefact is illustrated as a table 300, although a state machine may be utilized to identify the components, substances, and connections, as well as the flow of substances through defined connections between components. SBF knowledge bases which include such artefacts may be used for device and object structure, behavior, and function. Once entered, this knowledge may be used to examine the design of the models in order to perform such functions as improving or modify the designs. Additionally, the knowledge may be used to design an entirely new model. In contrast to TMK, which focuses on a task driven approach to solving a problem using known techniques, SBF organizes and makes available information.

An artefact is defined in terms of structure, behavior, and function. SBF knowledge has input and output values. To find a solution for an SBF knowledge set, known inputs and desired outputs are declared and the state machine tables are solved for the desired outputs. Generally, SBF knowledge is divided into "models" and "instances". A model is a template into which values are placed, while an instance is a set of values for a model. Accordingly, the inputs are desired values for a model and the outputs are instances which meet the specified input values. The inputs may comprise a structure, behavior, function, or a combination of these. The outputs would be instances which have the specified values.

For example, consider a knowledge base of toilets. There are a large number of toilet designs which may be divided into a number of different categories. For example, toilets may be distinguishable as intended for home use or for use in remote locations or for use in aircraft. Alternatively, they may be stationary versus portable. As illustrated in FIG. 3, a specific toilet may be described in terms of its structure 310 (size, components, etc.), behaviors 312 (flush, fill, etc.), and functions 314 (press handle, clean tank, etc.). Accordingly, the knowledge embodied in the SBF knowledge base could be used to design a toilet having specific properties. For example, suppose a designer wanted to design a toilet which uses 40% less water. The designer may use the knowledge base by retrieving (through special purpose software) existing toilets having desired structures, behaviors, functions, or a combination of these.

Continuing this example, the designer might request a list of all toilet designs having a particular tank capacity or having water flow rates within a given range. The list of toilets matching the defined criteria would be provided to the designer, who could then make modifications to arrive at a design of the desired specifications. This new toilet could be added to the knowledge base for use in subsequent designs.

The SBF approach is limited, however, because it does not contain strategic design information. While it may provide a model for toilets, instances of these models, and state diagrams for the behavior of toilets, there is no processing of these models, instances or state diagrams within the SBF knowledge base. The processing of this information requires specific programming to investigate and process artefact information.

Thus, the two knowledge encoding approaches represented by TMK and SBF differ in a number of ways. Accordingly, one approach may be more suitable for a particular type of knowledge than the other. This suitability influences the selection of a particular approach for a specific type of problem. The TMK language focuses on process or strategic knowledge, while the SBF language represents artefact, device, or object knowledge. These two types of knowledge are ontologically different, and current knowledge systems are generally designed to use either TMK or SBF. The present invention allows the entry of both strategic and artefact knowledge.

The present invention takes the following steps: the user defines a project; the user then defines one or more main tasks; these main tasks are defined by associating one or more method and procedures; the methods are associated with one or more subtask; all subtasks are associated with methods and procedures. The above process continues until the tree structure is complete. A project can have more than one top task, each of which can be run independently of the others.

Knowledge bases provide the strategy for solving problems. To use this knowledge, there must be "inputs", initial and desired values, settings, and parameters. For example, a strategy for solving a problem to design a new toilet will give solutions such as "design an entirely new toilet from first principles", "modify the design of an existing toilet", or "modify the design of a related non-toilet device (such as a pump)". A specific solution thus requires inputs which allow the process to find a solution, or a best solution. For example, the inputs to the toilet design problem may be the new attributes of the desired design (for example, uses 40% less water), a new component objective (for example, a design which uses a specific new level or handle). Identifying a "best" solution—which of several possible designs is preferred—requires that the knowledge base include such weighting information.

In order to enter inputs and outputs, structures for containing this data must be defined. These structures may be in one of several forms. Using a relational data base table is one implementation of such a structure. The definition of the structure allows for several instances of the structure, each with different data values. This is analogous to the data schema used for defining data base records, where, for example, a customer master record is defined with slots for name, address, phone numbers, etc. Each customer becomes an instance of this structure. In the knowledge base, the data structure will contain the inputs to and output from the methods and procedures, as well as the initial inputs and desired outputs of the main task or tasks.

Thus the process of knowledge entry requires defining the strategy (tasks, methods, and procedures); defining the data structures for knowledge and inputs; and providing appropriate inputs for each instance of the defined structures. Each of these processes is iterative, and it is through the refinement of these three steps that the whole knowledge base is defined and available for solutions. The process of defining the strategic knowledge hierarchy and that of defining the inputs and outputs are closely related; as the knowledge structure is changed, the inputs are also often changed. The process of solving a knowledge hierarchy is also iterative—the hierarchy with inputs gives one or more solutions. The user then reviews the solutions and will change the hierarchy or inputs to find other, possibly more suitable or more desirable solutions. This process of refinement ends when the user is satisfied with the solution found.

Figure 14:
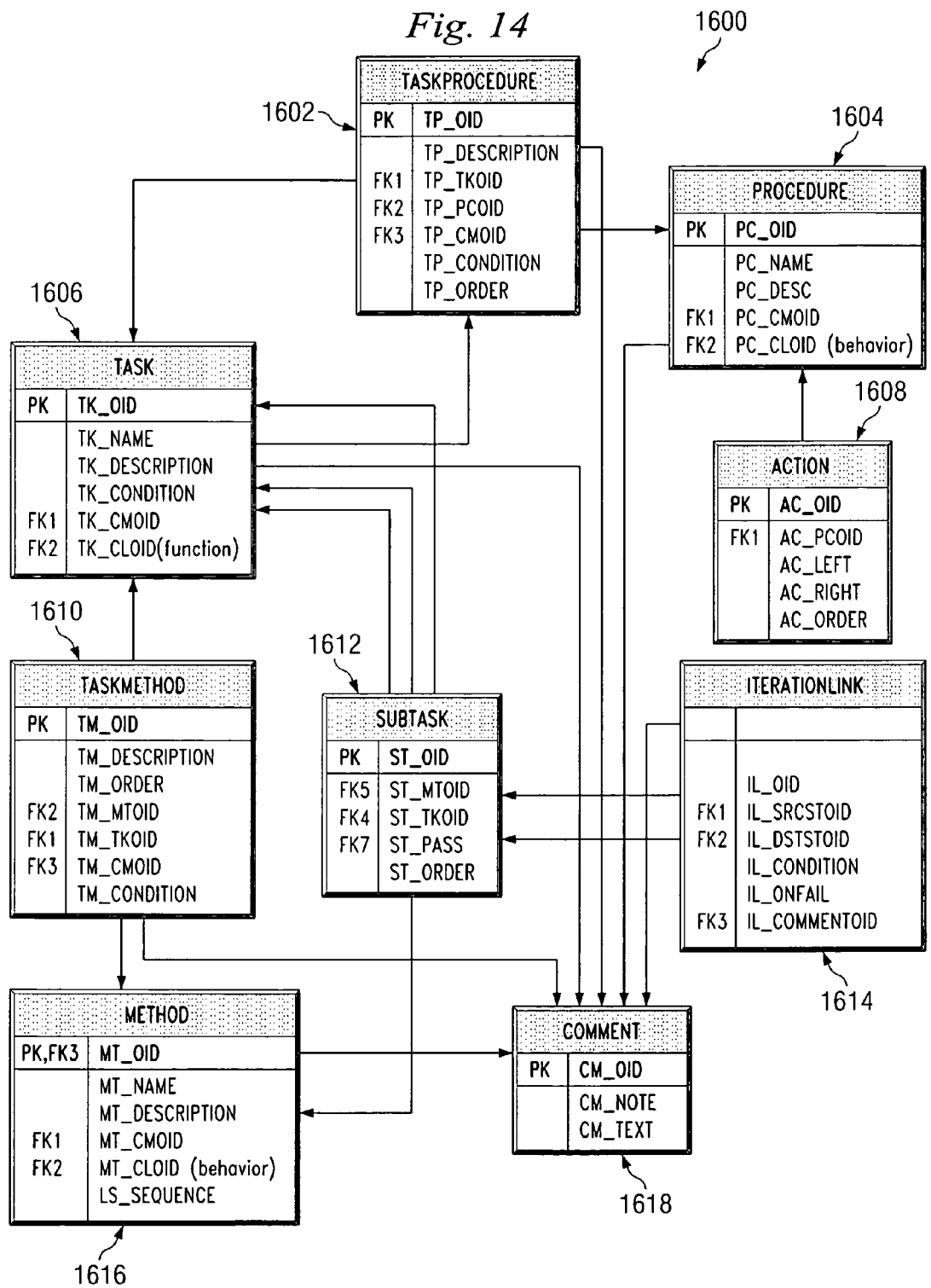
FIG. 14 illustrates one embodiment of the Task-Method-Knowledge storage representation.

The present invention provides a novel method for representing knowledge hierarchies and model information which allows for a graphic interface for the entry, display, review, and modification of such knowledge. This representation also allows for the interactive and graphical processing of the completed hierarchy to solution. Referring now to FIG. 14, element 1600 comprises linked elements representing the various types of objects within the hierarchy. Referring now to FIG. 4, this process 400 illustrates the knowledge entry process of the present invention. The user defines a new project 420 which will contain the knowledge, structures, and data. This collective is useful in saving, retrieving, and documenting all the elements associated with the project. For example, when the project is saved or retrieved, all elements (knowledge, structure, data, etc.) are saved or retrieved. The initial process definition is entered 430, and saved as the current strategy 422. The new input/output structures 432 are defined and saved as the defined knowledge 424. These structures may be refined 434 and resaved 424. The data structures are then filled 436 with instances of the knowledge data and saved 426. The user can then "run" the knowledge base for a solution, using the engine component of the present invention. The user may also refine the input and output structures 438 based on the instance data. Finally, the user may refine the process 440 by making changes to the defined strategy 422. This process of definition, run for solution, refinement may be repeated as needed with the result of a knowledge base suited to the solution of the intended problem.

Referring now to FIG. 14, this shows the data structure for the representation of the TMK hierarchy which is created, retrieved, modified, and stored in support of the graphic interface. The structure objects are linked to show relationships, for example, parent-child, or detail, for example, comments about the object. The different structure elements contain a unique object identified "OID", and then the information for the instance of the object. The OID is used to retrieve the object information. While other structures are possible, the illustrated structure permits the full description of an arbitrarily complex TMK hierarchy, where individual or related elements may be retrieved for review or modification.

Structure 1600 comprises the following types of elements: A TASKPROCEDURE element 1602 contains information common for both tasks and procedures, and a reference to a PROCEDURE element 1604 or TASK 1606 element respectively, which contain the unique information for a procedure or task respectively. The PROCEDURE element 1604 contains a reference to one or more procedure ACTION elements 1608, which contain the specific calculation or other action comprising the procedure. The TASK element 1606 contains a reference to both TASKMETHOD and SUBTASK elements, 1610 and 1612 respectively, identifying the specific methods and subtasks comprising the task element. The TASKMETHOD element 1610 contains information unique to the method and a reference to one or more METHOD elements 1616 which contain the details of the method. Similarly the SUBTASK elements 1612 contain subtask-unique information and a reference to one or more METHOD elements 1616 which contain the elements of the methods comprising the subtask. The hierarchy also contains ITERATIONLINK elements 1614 which provide for conditional processing of SUBTASK elements based on the success or failed state of one or more declared conditions.

This data structure allows for the compact and complete storage of the knowledge hierarchy, and allows for the retrieval of individual or related elements. Once retrieved, they may be processed for display, print, saving with modification. This is a technical advantage over current art which maintains hierarchies typographically as programming language statements.

The projects with all the knowledge, structures, and data are stored on the computer storage media where they may be retrieved, reviewed, modified, and re-saved at a future date. Thus, over time, the user will build up a repository of projects, each of which is suited to the solution of the desired problem. This repository may be shared among users with appropriate safeguards in place so that unauthorized users do not gain access to projects.

The current invention provides a graphical interface to the knowledge definition process shown in FIG. 4 element 400. This interface comprises well-known interface elements, such as, windows, command or control key sequences, mouse movements and button click, command or control buttons, and keyboard entry as defined or standardized in the computer environment in which the software runs. The present invention is not dependent on the environmental details of these facilities, only that a robust set of such facilities be available. Such environments are in common use on computer systems.

The user interface of the present invention consists of a set of graphical windows, each with appropriate interface controls and facilities. The user may freely move within and between these graphical windows to generate, display, modify, delete, and save specifications for knowledge, structures, and data for a project. Thus, while the user would normally perform the following steps in the given order, the user is not restricted to this order. As the defining of the knowledge base is an iterative process of refinement, the user may perform any of the steps a number of times.

Referring again to FIG. 4, the first step 420 of the process is defining the project itself. This comprises defining the project name, description, author, and company name. It also comprises a long description or abstract, background information, reference lists, and other descriptive data. Since the knowledge base may be used to solve design problems resulting in new devices and artefacts, the project information also include the patent claims for these results. This information may be reviewed and changed over the life of the project. The present invention also comprises project maintenance functions of project rename, delete, copy, save, export, etc. The computer display panel to collect this information, not shown, has appropriate input fields for user entry. When the new project is defined, appropriate data records are added to a repository on the computer magnetic storage media. These records may be retrieved, reviewed, modified, and saved using the interface provided.

Once the project is defined, the user starts entering strategic knowledge FIG. 4 422 by defining one or more tasks, methods, procedures and subtasks. This is done graphically where each type of element (task, method, subtask, etc.) is shown in a different shape. Thus, a task may be a rectangle, a method an ellipse, etc. Elements are shown as related by lines between related objects. Thus, a line from a task to a method has the obvious interpretation of the method for the task. A line is shown from a method to each of the method's subtasks, etc.

The user may add elements in a number of ways using mouse, keyboard, pull-down menus, command keys, etc. In the preferred embodiment, the following actions are assigned:

1. A new task or subtask may be added by selecting "New" from the menu
2. A new task or subtask may be added by double-clicking the mouse in an empty area of the display
3. A method may be added by double-clicking on the task or subtask to which the method is related
4. A method may also be added by choosing "New Method" from the menu
5. A subtask may be added by double-clicking on the method to which the task or subtask is related
6. A procedure may be added by choosing "New Procedure" from the menu
7. The details of a task, subtask, or method may be shown or hidden by selecting "Hide detail" or "Show detail" from the menu In addition to defining new tasks, methods, subtasks, and procedures, already defined elements may be moved within the hierarchy by a number of techniques. For example, to relate a method to a task, the graphic for the method (e.g. the ellipse representing the method), is dragged and dropped on top of the task to which it is to be related. It may also be related by a cut (or copy) action—using one of a number of techniques, e.g. control keys, mouse, menu selection—followed by a paste action. Further, elements may be located within the hierarchy using menu actions such as "Insert Task" or "Insert Method", etc. These actions will insert a previously indicated task or method, etc. or if no previously indicated element, will prompt for which element to insert, for example, by showing a list of defined elements of the selected type.

Each of the elements has properties depending on the type of element. These properties are entered into a screen (not shown) at the time the element is defined. These properties may be reviewed and changed at a later time. This action may be initiated in a number of ways. In the preferred embodiment, the user may select an element's properties display by single clicking on the element of selecting "Properties" from a menu.

In the processing of methods and tasks within a hierarchy, tasks may be regarded as successful or failed, based on criteria defined by the user. For example, a task to find a phone number may be successful if a phone number is found and failed otherwise. When solving a knowledge hierarchy, the sequence of tasks and subtasks is typically determined by the success or failure of tasks. For example, the task to design a new handle would not be done if the previous task to design the valve failed. Thus, the user must be able to not only indicate the sequence of tasks, but also the success or failure paths between tasks. The preferred embodiment allows the user to specify the sequence of subtasks by graphically locating them left-to-right in the order desired. This may be done in a number of ways, for example, assigning an "order" attribute in the properties of each subtask, drag and drop the subtasks in the left-to-right order, moving the graphic representing the subtask within the subtask group of the hierarchy, etc. Each subtask may also be assigned success or failure attributes such that the subtask is processed on the success or failure determination of the parent or sibling tasks. For example, if the phone number were found from a personal address book, directory assistance would not be called. Referring again to FIG. 5, method 1 512 would be processed before method 2 526.

Referring again to FIG. 4, the knowledge system processes data and data structures to give a solution. After defining the strategy 422, the user defines the knowledge structures 424 and the data which they contain 426. This process is graphical and iterative, allowing the user to define, review, and modify both structures and data over time 434 and 426 respectively. That is, the user can initially define structures 432 and data 436, and then later refine them 438 for a specific task or to improve or change the processing of the knowledge system 440. Previously defined structures and data may be assigned as the inputs or outputs of methods and procedures. Once assigned, they may be reviewed and modified 434.

Finally, once the knowledge hierarchy, structures and data are defined, the user may process the knowledge system to produce a solution. This entails selecting a high level task for solution. A path through the hierarchy is taken depending on the success or failure of tasks and the data within the structures. The user may set logging and tracing requests to monitor or review the processing of the hierarchy, structure and data. The user may then use this information to modify the elements. These steps of defining elements, relating them to each other, reviewing and modifying the elements, defining structures and data, and processing the hierarchy for a solution are repeated until the desired knowledge system is achieved.

Referring now to FIG. 15, the above steps are accomplished as the user 1540 of the invention interacts with the computer system using the IDE 1510. As the knowledge is entered or modified, it is stored in the knowledge database or storage system 1520. The IDE comprises the following views, each described separately:
   Knowledge Entry and View
   Structure (Form) View
   Structure Graphical View
   Function and Behavior View
   Substance Editor
   Procedure Editor
   Condition Editor
   Object Editor
   Knowledge Entry and View The knowledge hierarchy is entered and viewed in a component of the current invention termed "TMK View". This component allows the user to graphically enter and view knowledge hierarchies. Referring now to FIG. 3, this illustrates one embodiment of this component which comprises the following features:
   Visual clues to the type of element by shape, color or other technique
   Access via mouse, keyboard, and menu items to actions which add new tasks, methods, procedures, and input and output specifications
   Direct manipulation of the hierarchy by drag and drop, mouse and keyboard actions
   Access to panels—via mouse, keyboard, menu selections, etc.—for the entry of properties, review, and modification for hierarchical elements
   Access to panels—via mouse, keyboard, menu selections, etc.—for searching and locating elements based on selection criteria, including element name, properties, relationships, etc.

Referring now to FIG. 5, this illustrates one embodiment of this process. This panel shows a TMK hierarchy where task 510 and subtasks 514-518 are shown as rectangles. Method 512 is shown as an ellipse and all child details 514-524 are shown. Methods 526 and 520 are shown as trapezoids as their child details are not shown. Procedures 522 and 524 are shown as barred rectangles, and procedure 524 is recursive and identified with a counter clockwise arrow 528. Tasks may also be collapsed (not shown) in a similar way. Thus the user may immediately see the hierarchy in as little or as much detail as desired.

Structure (Form) View

Data structures are created, entered, reviewed, modified, and deleted using a panel termed "Form View". In the preferred embodiment, this form view panel allows the specification of a data structure. Referring to FIG. 6, this illustrates a typical specification of a data structure. The definition comprises the specification of
   Components 610—Name and type, where type comprises types for containers, pipes, metal parts, rubber parts, and other user-defined types
   Connections 612—Name, type, from, to, substance, where type matches the type of a component or user-defined structure, from and to are the name of defined components, and substance is a defined substance
   Behaviors 614—Name and type, where type is "Method" or "Procedure"
   Functions 616—Name and behavior, where behavior is the name of a defined behavior. Functions also have "Given Name" and "Makes Name" which give synonyms for display of defined functions
   Substance 616—Name and type, where type is a standard or user-defined type, for example "Liquid" or "Force"

This panel comprises control actions for the definition of new components, connections, behaviors, functions, and substances, and for the specification of the details if the new element. It also comprises—via mouse, keyboard, control keys, etc.—for the review, modification, deletion, and saving of the specifications of defined elements.

Structure Graphical View

The data structure may be graphically depicted by representing them with graphical shapes and locating them in a display such that related elements are graphically connected. Referring now to FIG. 7, this illustrates the graphical view of the structure shown in FIG. 6. In this display, components 710-724 are shown in one shape (circle), connections 726-738 are shown in a different shape (diamond), and the related objects are shown connected by directed lines 740-752 (arrows). This view comprises—via mouse, keyboard, control keys, etc.—functions to add, review, modify, move, and delete elements, by direct manipulation (drag and drop, for example), or selection of menu actions. Thus, the graphical view and form view show the same data and changes in one view affect changes to in the other view.

Function and Behavior View

Figure 8:
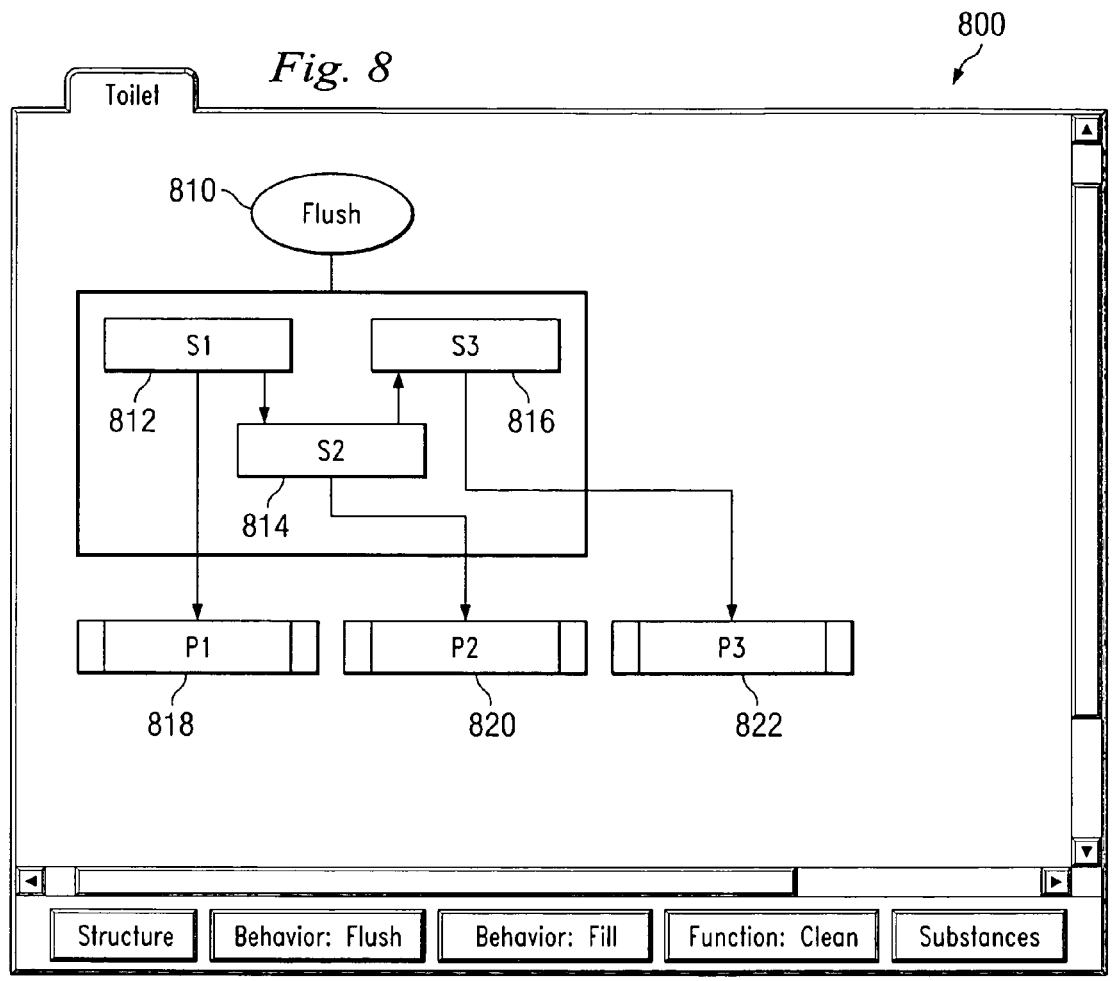
FIG. 8 illustrates one embodiment of the behavior sheet panel.

The preferred embodiment of the present invention comprises panels for entering, reviewing, and modifying the functions and behaviors of defined structures. Referring now to FIG. 8, this illustrates one embodiment of the present invention behavior view. The flush behavior 810 comprises three subtasks 812-816 and three procedures 818-822. This hierarchy is the behavior logic of the "Flush" behavior element 614 of FIG. 6, shown as a TMK hierarchy, also shown as "Method 1", element 512 of FIG. 5. This allows the user to design the behaviors of an artefact either independently of the rest of the hierarchy, by using the Behavior View panel shown in FIG. 8, or as shown within the entire hierarchy using TMK View panel shown in FIG. 5.

Similarly, functions of an artefact may be shown as TMK hierarchies. Referring now to FIG. 9, this shows the "Clean" function, element 616 of FIG. 6 as a hierarchy, which may also be seen as element 520 of FIG. 5 corresponding to element 912 of FIG. 9. Notice that 520 of FIG. 5 has detail hidden, so the "Clean" procedure 910 of the "Flush" method 912 is not shown in FIG. 5.

Substance Editor

The preferred embodiment of the present invention comprises panels for the entry, review, modification and saving of substance definitions. Referring now to FIG. 10, this shows a grid for the entry of the name 1010 and type 1012 of substances used in the design of the artefact. The names 1010 and types 1012 entered correspond to the name and type shown as elements 618 of FIG. 6. The panel allows for the entry of new substances, and the review and change of previously defined substances.

Procedure Editor

The preferred embodiment of the present invention comprises panels for entering, reviewing, and modifying the procedures used by tasks. This process comprises commands and other interactions with the user to enter, review, modify, and save the series of actions that constitute a procedure. It provides the details of each procedure defined, including, name, description, and a list of all procedure actions. Each procedure action is defined by naming a local variable or global output variable, and the arithmetic expression or other defining function for the variable. The actions are arranged in the order in which they are processed. A list of global output variables and local variables is available for review and selection. The Procedure Editor thus allows the graphic input of procedures, then checks the defining actions such that they meet certain criteria, for example, the expressions are well-formed (have the correct number of parameters for functions), they reference defined variables, etc. When the procedure details are entered, they are saved for subsequent review and modification or processing during knowledge solution processing.

Figure 11:
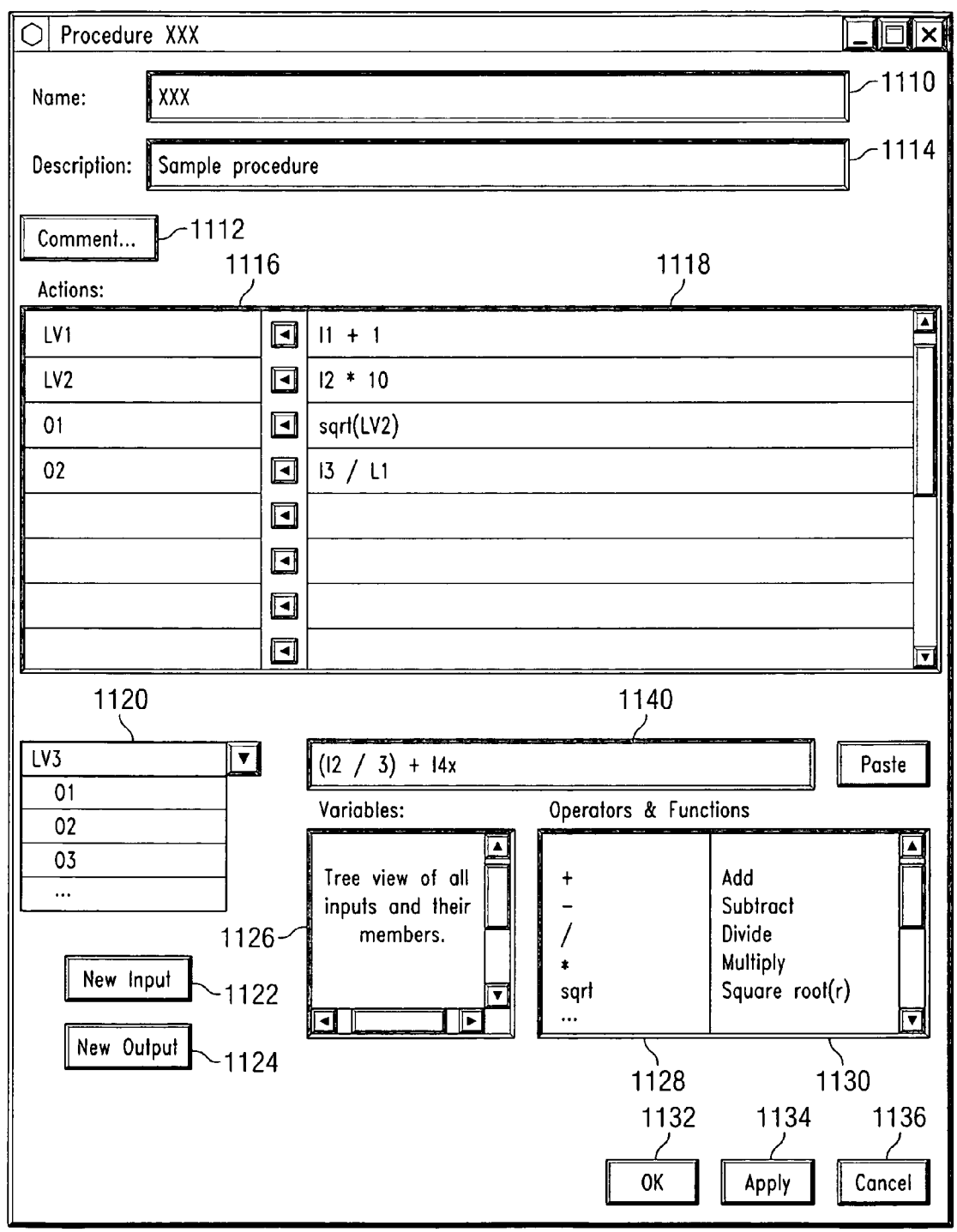
FIG. 11 illustrates one embodiment of the procedure editor panel.

Referring now to FIG. 11, this shows the preferred embodiment of the Procedure Editor panel. The user may enter name 1110, description 1112, and comment 1114 information about a procedure. The name 1110 of the procedure corresponds to the name assigned to the procedure using the procedure's "Property" panel.

The procedure logic consists of a list of statements, where the left-hand side is an output, or a local variable (used only within the procedure and not available to other procedures), and the right-hand side is an expression which calculates a value. When the statement is processed, the output or local variable is assigned the value of the expression. The statements are processed in order, top to bottom. The user constructs an expressing in the work area 1140, by selecting variables from the list of available variables 1126 and operators and functions from the list of available operators and functions 1128. List 1130 is a short description of the operator or function appearing in the corresponding position in list 1128. Once the expression is constructed in work area 1140, it may be pasted to a specified line in the expression area of the panel 1118. The user specifies the input, output, or local variable by selecting it from the list of available variables 1120 and pasting it into the specified line of the variable area of the panel 1116. If a new input, output, or local variable is needed, buttons 1122 and 1124 may be selected, which then shows a panel for defining a new variable, making it then available in list 1120. Buttons are provided which allow the user to cancel changes 1136, apply changes and stay on the panel 1134, or apply changes and return to the previously shown panel 1132.

Condition Editor

The condition editor allows the entry of two types of conditions: tests of an input to determine which, if any, of a tasks methods or procedures should be processed; and tests of a task's outputs to determine if the task was successful or not. These conditions may be entered, reviewed, modified, and changed. A condition consists of an expression consisting of input or output variables, operators or functions (for example, equal, greater than, etc.), and test values or expressions. The user enters the conditions in the form of one or more expressions, the last of which is results in true or false, interpreted as success and failure respectively.

Figures 12, 13:
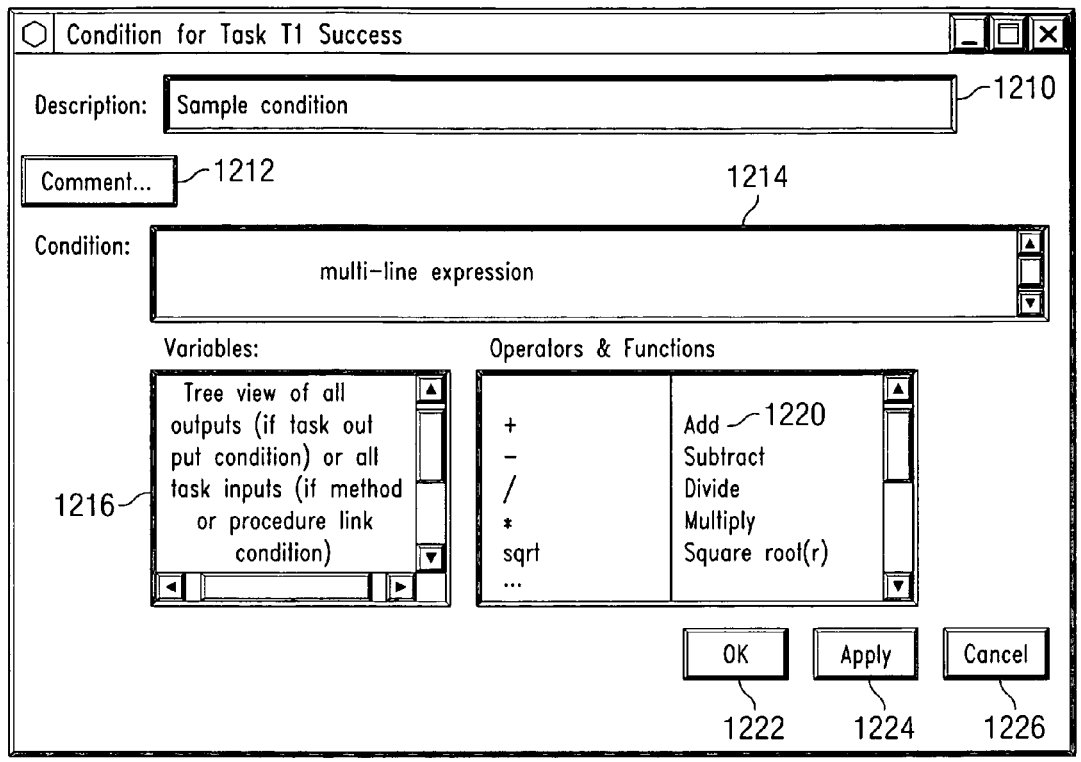
FIG. 12 illustrates one embodiment of the condition editor panel.
FIG. 13 illustrates one embodiment of the object editor panel.

Referring now to FIG. 12, this illustrated the preferred embodiment of the current invention. The panel 1200 allows the user to enter a description 1210 and comment 1212 for the defined condition. The condition consists of a multi-line expression 1214 constructed by selecting variables from list 1216 and operators and functions from list 1218. (List 1220 shows the name of the corresponding operator or function from list 1216.) Buttons are provided which allow the user to cancel changes 1226, apply changes and stay on the panel 1224, or apply changes and return to the previously shown panel 1222.

Object Editor

This component illustrates all unmapped input and top-level output variables and allows the user to supply values for them, either as initial input values or as mapped to the input of a method or procedure. It also allows the user to review all unmapped outputs. The user may then assign values to the inputs and map inputs to the unmapped outputs. In this way, the user may set one or more scenarios for the processing of the knowledge.

Referring now to FIG. 13, this shows the preferred embodiment of the current invention. Panel 1300 lists all objects not mapped as an input or an output. Each object consists of a name 1310, type 1312, value 1314, and reference 1316. If the type 1312 is a class (e.g. "ClassB"), then the "±" column 1318 allows the user to select to see or hide the elements of the class. If the elements are hidden, column 1318 shows a "+", which if selected shows the elements. If the elements are shown, column 1318 shows a "−" which if selected hides the elements.

The panel 1300 also comprises the present and total number of unmapped objects 1324, and buttons allowing the user to move to the first 1330, last 1332, next 1328, or previous 1326 element.

The user may assign a value to an unmapped input by selecting the object's "Value" column, for example, "b.items"

1320. The user is then shown a panel (not shown) were the value of the object may be assigned. The user may map outputs to objects by selecting the object's "Reference" cell, for example "c.p" object's reference cell 1322. The user is then shown a panel (not shown) where the output value is mapped to an input variable.

System for Knowledge Entry

The above embodiments of the current invention are connected in a way so that the user may easily:

- Search for and locate desired elements by name, type, attribute or other selection criteria
- Jump from the screen processing one element to the screen processing another element (whether related to the first or not) and optionally return
- Print reports of various kinds, including, elements by type, hierarchical diagrams, input/output mappings, referenced and undefined elements, etc.
- View one or more "windows" simultaneously by arranging them in overlapping or non-overlapping patterns on the computer display screen The result is a comprehensive system for the entry, review, modification, saving, and processing of knowledge hierarchies of arbitrarily large size and complexity. The system allows the user to iterative define the knowledge; define and assign input values; then process the hierarchy to a solution; review the solution and accept it or modify one or more of the knowledge, inputs, processes, procedures, conditional statements, or data mappings; then re-run for an alternative solution. Finally, the system allows for the entry of descriptions, commentary, narratives, and patent application information (e.g. patent claims), so that the knowledge system is documented and understandable by others.

Referring now to FIG. 15, this illustrates one embodiment of the Knowledge Engine. A computer system includes software components of Interactive Development Environment (IDE) 1510, Database System 1520, and Knowledge Engine 1530. The user 1540 interacts with the IDE using the various input and output devices of the computer system 1550. Using the IDE 1510, the user 1540, enters the structure of the TMK hierarchy, including all tasks, subtasks, methods, and procedures described above. The hierarchy structure is saved in the Database System 1520 in an internal format (shown in FIG. 14). That is, the hierarchy is passed to the Knowledge Engine 1530 which verifies the structure, and then converts it to an internal format, suitable for saving on the Database System 1520. The IDE 1510 may pass the hierarchy to the Knowledge Engine 1530 one component at a time (e.g. one task, subtask, method, procedure, or data structure) or the entire hierarchy at once, or one portion of the hierarchy, for example, a changed portion of the hierarchy. Once saved, the hierarchy is available for the process shown in FIG. 14.

Figure 16:
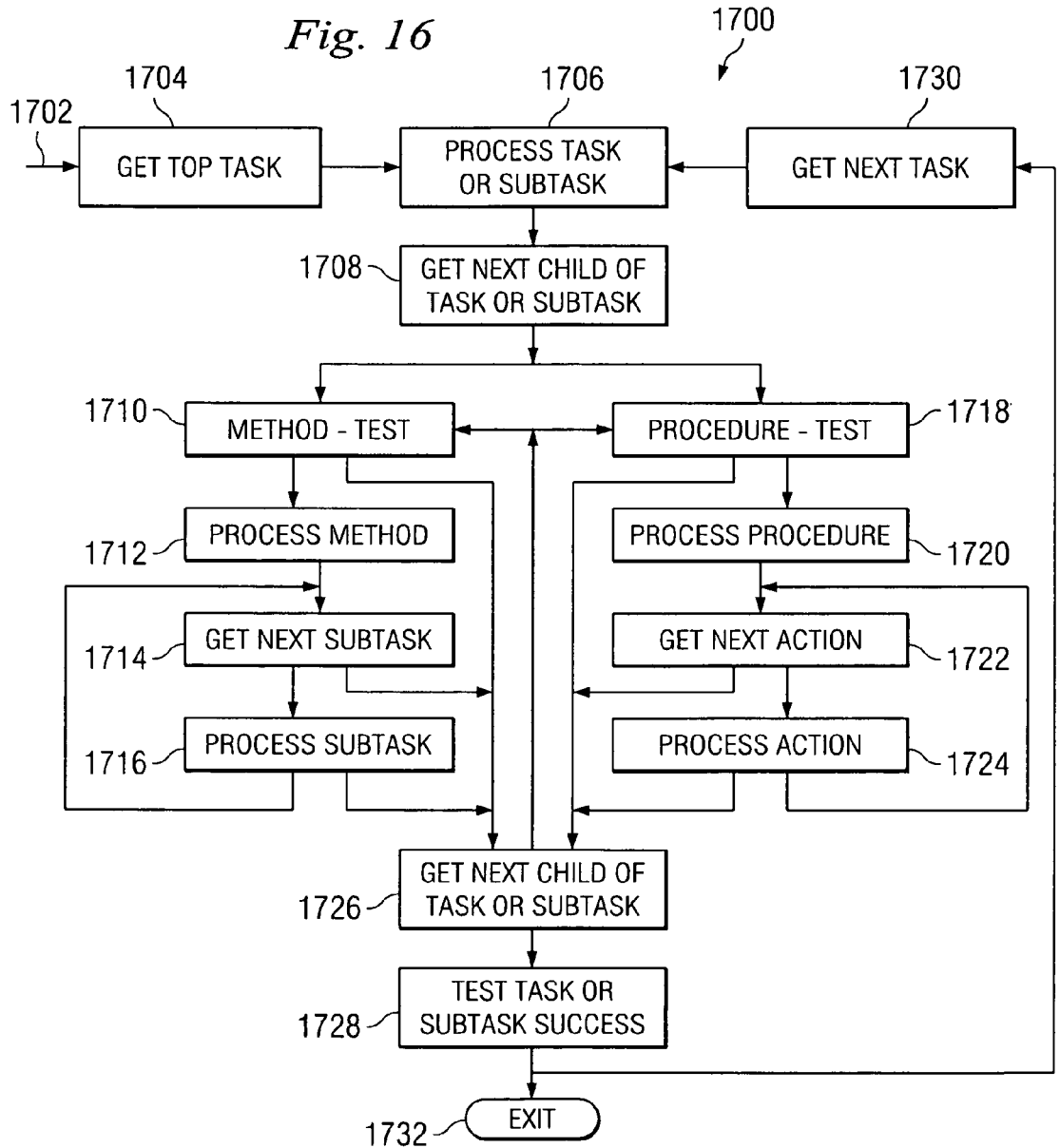
FIG. 16 illustrates a flow chart showing hierarchy solution processing.

Referring now to FIG. 16, the process to solve a hierarchy 1700 enters at point 1702, then continues to get top task 1704. The task is processed 1706 doing any initialization necessary. The first child of the task is selected 1708, which child is either a method or a procedure. If the child is a method, then the method condition is tested 1710. This condition may cause the method to not be processed, in which case, processing continues with get next child of task 1726. If the tested condition 1710 indicates the method is to be processed, it is processed 1712. The first or next subtask of the method is selected 1714, and processed 1716. The processing of a subtask 1716 proceeds identically and recursively as for the main task, entering at point 1706. If there is more than one child of a task, the children are processed in order until one child succeeds.

Returning now to step 1716, once the subtask is processed, the next subtask is selected 1714 and processed 1716 until all subtasks of the method have been processed. When all subtasks have been processed, processing continues at step 1726 by selecting the next child of the task or subtask currently being processed. As this is a recursive step, well-known techniques are used to identify both the task or subtask being processed, and what is the next child of this task or subtask even though there may be several tasks and subtasks active at this point of processing. The next child of the task or subtask then returns to 1710 if the child is a method, or 1712 if the child is a procedure; then the child is processed as described above.

Returning now to step 1708, if the next child of the task or subtask is a procedure, processing continues at step 1718. This processing is similar to the processing for methods starting at step 1708. The test condition 1718 is checked and the procedure is processed at step 1720 or not processed by continuing at step 1726. If the procedure is processed 1720, each action is selected 1722 and processed 1724 until all actions have been processed. Processing then continues to get next child of task or subtask 1726.

When there are no more children of the task or subtask in step 1726, the success of the task or subtask is determined by comparing the desired condition and the conditions calculated in the processing of the task. If the desired conditions are not met, and there are additional tasks to process, processing continues at step 1730, by getting the next task or subtask and then processing as described above.

The Knowledge Engine provides the following functions of running and displaying the processing of a solution of a hierarchy:

1. Validation function—validate an action, a condition, or a procedure; notify the user of any errors, warnings, or messages, or indicating that none were found.
2. Running a model in run, debug, or trace mode, including running to a selected element or previously defined breakpoint.
3. Stop, pause, or restart the running of a model.
4. Displaying, printing, searching, or clearing a debug or trace log.

Referring now to FIG. 15, the Knowledge Engine 1530 interacts with the IDE 210 for the following functions:

1. Display and allow the selection of options through various techniques, including main and pop-up menus, option entry panels, defaults, and user profiles.
2. Display a list of previously saved hierarchies and allow the selection of one or more for review, modification, or processing.
3. While running a model, display the hierarchy and dynamically alter the visual appearance of elements when the element state changes, for example, when active, when visited, when successful, when failed, etc.
4. Also while running a model, display informational and error messages Referring now to FIG. 15, the Knowledge Engine 1530 interacts with the Database 1520 and performs the following functions:

1. Save and retrieve saved hierarchies or portions of hierarchies
2. Retrieve lists of saved hierarchies
3. Name, rename, and display and alter attributes of saved hierarchies and hierarchy elements Referring now to FIG. 17, this illustrates one embodiment of the components of the Knowledge Engine:

1. The engine itself 1530, detailed above

2. The interface to the Interactive Development Environment component 1520, detailed above
3. The "compiler" 1940 which translates the hierarchy from graphical form to a form which is saved on the data base 1520 and processed by the Knowledge Engine 1530. It will be understood that the use of a compiler is an example of the broad concept of translating or interpreting a set of inputs based on a graphical representation to provide outputs which are formatted for entry into a database.
4. The "loader" 1950 which retrieves the saved hierarchy from the database 1520 and makes it ready for processing.
5. The "logging" 1960 component, which collects and saves trace information, and informational and error messages into a "log" which is saved (in the data base 1520 or other magnetic media, printer, display, or other device) for possible later review.

Figure 17:
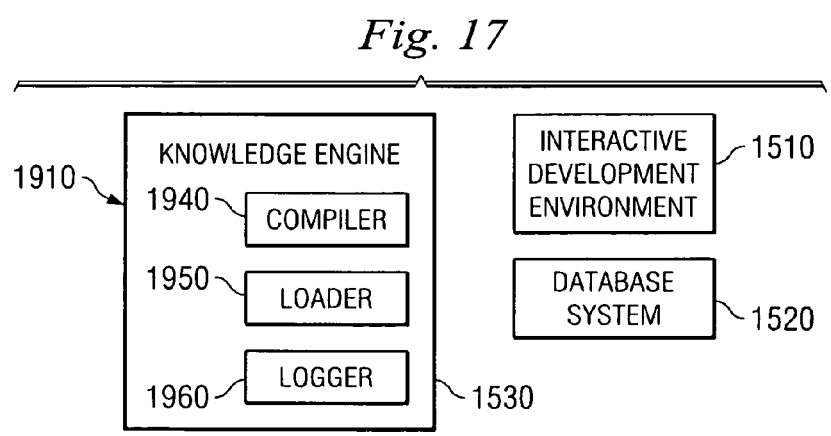
FIG. 17 illustrates a schematic diagram of a knowledge engine.

Referring still to FIG. 17, the compiler 1940 performs the following functions:
1. When provided with a top-level task, the model definition in the data base 1520 will be compiled and parsed into objects, converted into an internal form which can be saved in any form, for example as a file, IP packet or in the data base 1520 and at a later time, retrieved by the loader 1950. (The user may also export the objects to a location and format selected by the user for some other process.)
2. Return a list of error that occurred in the compilation and parsing of step 1.
3. Verify that actions or conditions are well-formed definitions, and confirm that a procedure is valid. The meaning of "well-formed" and "valid" are documented and made known to the user in error messages, user manuals, help panels, etc. Specifically, errors in definitions are detected and shown to the user (using the interface to the IDE 1510) or written to the log, or both.
4. Cancel a compilation in progress, due to user request, or the detection of a number or severity of errors.

The loader 1950 performs the following functions:
1. Set or remove a "break point" which affects the processing of the model by changing from "run" mode to "step" mode at the processing of a specified model element.
2. Run a model to completion or until stopped by the user, break point, error, or others terminating event
3. Run a model in "debug" mode where break points, pauses, user interactions, etc. are used to see, change, and restart the running of a model in close interaction with the user
4. Run a model in "step" mode where a single sequential element is processed at a time
5. Pause the running of a model, allowing the user to view and change elements and intermediate or temporary data or values
6. Stop the running of a model due to user interaction or error This system provides a technical advantage over current art by being iterative, graphical, robust, and easy-to use. It does not require the entry of knowledge as textual strings. Rather, it provides a novel means of representing knowledge. The user employs an interactive and graphical interface to enter and modify the knowledge hierarchy, and to run the completed hierarchy to solution.

What is claimed is:

1. A knowledge system for solving a problem identified by a user, the knowledge system comprising:
a display device;
an interactive development environment ("IDE") comprising a graphical user interface ("GUI") presented on the display device for enabling a user to enter and modify a collection of Task-Method-Knowledge (TMK) or Structure-Behaviors-Functions (SBF) data comprising a plurality of knowledge data elements defining strategy for solving the identified problem, wherein the IDE causes each of the TMK or SBF knowledge data elements to be represented on the display device by an object having at least one visual characteristic indicative of a type of the represented knowledge data element and further causes a relationship between related knowledge data elements to be graphically represented on the display device by a link between the objects representing the related knowledge data elements;
a knowledge engine for converting the collection of TMK or SBF data to an internal format;
a database for storing the collection of knowledge data; and
means for processing the converted collection of knowledge data to solution and providing the solution to a user.

2. The knowledge system of claim 1 wherein entry and modification of the knowledge data collection can be performed by cutting, pasting, and clicking and dragging the objects representing the knowledge data elements.

3. The knowledge system of claim 1 wherein the IDE passes the collection of knowledge data to the knowledge engine in its entirety.

4. The knowledge system of claim 1 wherein the IDE passes the collection of knowledge data to the knowledge engine a portion at a time.

5. The knowledge system of claim 1 wherein the IDE passes the collection of knowledge data to the knowledge engine one component at a time.

6. The knowledge system of claim 1 wherein the knowledge data comprises strategic and artifact knowledge.

7. The knowledge system of claim 1 wherein the knowledge engine performs at least one function selected from a group consisting of validating and notifying, running a model in one of a variety of modes, stopping, pausing, or restarting the running of a model, and displaying, printing, searching, or clearing a debug or trace log.

8. The knowledge system of claim 1 wherein the knowledge engine interacts with the IDE to perform at least one function selected from a group consisting of:
displaying and enabling selection of options;
displaying a list of previously saved collections of knowledge data and permitting selection of one or more previously saved collections of knowledge data for review, modification or processing;
displaying a collection of knowledge data while running a model and dynamically altering the visual appearance of elements when the state thereof changes; and
displaying informational and error messages while running a model.

9. The knowledge system of claim 1 wherein the knowledge engine interacts with the database to perform at least one function selected from a group consisting of:
saving and retrieving saved knowledge data collections or portions of knowledge data collections;
retrieving lists of saved knowledge data collections; and
enabling naming, renaming, displaying, and altering attributes of saved knowledge data collections and elements thereof.

10. The knowledge system of claim 1 wherein the knowledge engine further comprises:

a compiler for translating a collection of knowledge data from a graphical form to a form in which it is saved in the database and processed by the knowledge engine;

a loader for retrieving a saved collection of knowledge data from the database and preparing it for processing; and a logger for collecting and saving into a log trace information and informational and error messages.

11. The knowledge system of claim 1 wherein the identified problem comprises a scheduling problem and the solution provided by the means for processing and providing comprises a master schedule.

12. A computer program product for implementing a knowledge system for solving a problem identified by a user, the computer program product stored on computer-readable media and comprising instructions executable by a computer for causing the computer to:

present on a display of the computer a graphical user interface ("GUI") for enabling a user to enter and modify a collection of TMK or SBF knowledge data comprising a plurality of knowledge data elements defining strategy for solving the identified problem, wherein the IDE causes each of the knowledge data elements to be represented on the display device by an object having at least one visual characteristic indicative of a type of the represented knowledge data element and further causes a relationship between related knowledge data elements to be graphically represented on the display device by a link between the objects representing the related knowledge data elements;

convert the collection of TMK or SBF knowledge data to an internal format; store the converted collection of knowledge data in a database; process the converted collection of knowledge data to solution; and provide the solution to a user.

13. The computer program product of claim 12 wherein entry and modification of the knowledge data collection can be performed by cutting, pasting, and clicking and dragging the objects representing the knowledge data elements.

14. The computer program product of claim 12 wherein the knowledge data comprises strategic and artifact knowledge.

15. The computer program product of claim 12 further comprising computer-executable instructions for causing the computer to:

run a model in one of a variety of modes;

stop, pause, or restart running of a model; and display, print, search, or clear a debug log or a trace log.

16. The computer program product of claim 12 further comprising computer-executable instructions for causing the computer to:

display a list of previously saved collections of knowledge data and enable selection of one or more previously saved collections of knowledge data for review, modification or processing;

display a collection of knowledge data while running a model and dynamically alter the visual appearance of elements when a state thereof changes; and display informational and error messages while running a model.

17. The computer program product of claim 12 further comprising computer-executable instructions for causing the computer to:

save a knowledge data collection;

retrieve a saved knowledge data collection;

retrieve lists of saved knowledge data collections; and enable naming, renaming, displaying, and altering of attributes of saved collections of knowledge data and elements thereof.

18. The computer program product of claim 12 further comprising computer-executable instructions for causing the computer to:

translate a collection of knowledge data from a graphical form to a form in which it is saved in a database and processed by a knowledge engine;

retrieve a saved collection of knowledge data from the database and prepare it for processing; and collect and save into a log trace information and informational and error messages.

19. The computer program product of claim 12 wherein the identified problem comprises a scheduling problem and the provided solution comprises a master schedule.

20. A method of implementing in a computer a knowledge system for solving a problem identified by a user, the method comprising:

presenting on a display of the computer an interactive development environment ("IDE") comprising a graphical user interface ("GUI") for displaying a collection of TMK or SBF knowledge data comprising a plurality of knowledge data elements defining strategy for solving the identified problem;

graphically representing each one of the knowledge data elements on the display within the GUI as an object having at least one visual characteristic indicative of a type of the one of the knowledge data elements represented thereby;

graphically representing a relationship between related ones of the knowledge data elements on the display within the GUI as a link between the objects representing the related knowledge data elements;

enabling a user to enter and modify the TMK or SBF knowledge data elements by cutting, pasting, and clicking and dragging the objects representing the knowledge data elements;

enabling a user to enter and modify relationships between the TMK or SBF knowledge data elements by cutting, pasting, and clicking and dragging links between the objects representing the knowledge data elements;

converting the collection of TMK or SBF knowledge data to an internal format;

storing the collection of knowledge data in a database;

processing the converted collection of knowledge data to solution; and providing the solution to a user.

* * * * *